US011060256B2

(12) United States Patent
Foster

(10) Patent No.: US 11,060,256 B2
(45) Date of Patent: Jul. 13, 2021

(54) STRUCTURAL MAINTENANCE SYSTEM

(71) Applicant: Hegel Industrial Solutions Pty Ltd, Brisbane (AU)

(72) Inventor: Darren James Foster, Brisbane (AU)

(73) Assignee: Hegel Industrial Solutions Pty Ltd, Brisbane (AU)

( * ) Notice: Subject to any disclaimer, the term of this patent is extended or adjusted under 35 U.S.C. 154(b) by 0 days.

(21) Appl. No.: 16/312,504

(22) PCT Filed: Jun. 21, 2017

(86) PCT No.: PCT/AU2017/050626
§ 371 (c)(1),
(2) Date: Dec. 21, 2018

(87) PCT Pub. No.: WO2017/219079
PCT Pub. Date: Dec. 28, 2017

(65) Prior Publication Data
US 2019/0161932 A1 May 30, 2019

(30) Foreign Application Priority Data
Jun. 23, 2016 (AU) ................................ 2016902458

(51) Int. Cl.
*E02D 5/64* (2006.01)
*E02B 17/00* (2006.01)
*B25J 5/02* (2006.01)
*E01D 19/02* (2006.01)
*E02B 3/06* (2006.01)
(Continued)

(52) U.S. Cl.
CPC ........... *E02B 17/0034* (2013.01); *B25J 5/007* (2013.01); *B25J 5/02* (2013.01); *B25J 11/0055* (2013.01); *B25J 11/0075* (2013.01); *B25J 11/0085* (2013.01); *B25J 19/021* (2013.01); *B25J 19/022* (2013.01); *B25J 19/026* (2013.01); *B25J 19/027* (2013.01); *E01D 19/02* (2013.01);
(Continued)

(58) Field of Classification Search
CPC . E02B 17/0034; E02B 3/06; B25J 5/02; B25J 11/0055; B25J 11/0075; B25J 11/0085; B25J 19/022; B25J 19/026; B25J 19/027; E01D 19/02; E02D 19/106; E02D 5/64
See application file for complete search history.

(56) References Cited

U.S. PATENT DOCUMENTS 3,426,585 A * 2/1969 Zemanek, Jr. ....... G01N 29/041
73/622
4,102,203 A * 7/1978 Sylvester .................. B63B 9/00
73/620
(Continued)

FOREIGN PATENT DOCUMENTS

WO 1987001672 A1 3/1987
WO 2015176132 A1 11/2015

*Primary Examiner* — Benjamin F Fiorello
(74) *Attorney, Agent, or Firm* — Boyle Fredrickson S.C.

(57) ABSTRACT

A pier maintenance system and a structural maintenance system are provided. The pier maintenance system is configured to maintain elongate members of the pier (e.g. piles). The pier maintenance system includes a delivery module, configured to navigate between the elongate members; and a maintenance module, coupled to the delivery module, and configured to navigate along the elongate members, to maintain the pier.

19 Claims, 5 Drawing Sheets

(51) Int. Cl.
    *B25J 11/00*         (2006.01)
    *B25J 19/02*         (2006.01)
    *E01D 19/10*        (2006.01)
    *B25J 5/00*          (2006.01)

(52) U.S. Cl.
    CPC .............. *E01D 19/106* (2013.01); *E02B 3/06* (2013.01); *E02B 17/00* (2013.01); *E02D 5/64* (2013.01)

(56) References Cited

U.S. PATENT DOCUMENTS

| | | | |
|---|---|---|---|
| 4,170,429 A | | 10/1979 | Mathieu |
| 4,628,737 A | * | 12/1986 | Charles ............... E02B 17/0034 73/624 |
| 4,843,884 A | * | 7/1989 | House .................... G01N 29/26 73/622 |
| 5,790,620 A | * | 8/1998 | Okazaki ............ B23K 26/0608 376/305 |
| 5,857,534 A | | 1/1999 | DeVault et al. |
| 2006/0042659 A1 | | 3/2006 | Fernandez et al. |
| 2008/0313915 A1 | * | 12/2008 | Dos Santos ............. B63C 11/52 33/568 |

\* cited by examiner

STRUCTURAL MAINTENANCE SYSTEM

TECHNICAL FIELD

The present invention relates to maintenance of structures. In particular, although not exclusively, the present invention relates to automated inspection, maintenance and repair of structures, such as bridges, wharves and jetties, including elongate members which may be submerged in water.

BACKGROUND ART

Steel and concrete piles are widely used to support marine structures, such as bridges, wharves and jetties. These piles are thus typically exposed to seawater, which can cause corrosion and damage of the piles at and under the water line.

Steel piles exposed to seawater may be susceptible to pitting, which can lead to a compromise in the structural integrity of the pile. Similarly, concrete piles are typically reinforced by steel, which is also susceptible to corrosion, particularly when the surrounding concrete is cracked.

Such problems can be difficult to detect, particularly as they often occur underwater, yet can lead to failure of the pile and in turn the structure which is being supported. The problem is exaggerated with bridges, wharves and jetties, which typically have many such piles.

Typically, piles are visually inspected, periodically by divers. A diver, often equipped with a camera and measuring tool, inspects the piles for damage, and documents any such damage, which can be used to schedule maintenance or repair of the piles. This process is typically very costly, particularly on large structures, due to the nature of manual inspections. Furthermore, manual inspection by divers is highly subjective, which makes comparison of measurements between divers difficult.

Due to the cost of divers, maintenance of these piles is generally limited to damage, and as thus more repair related than preventative maintenance.

Accordingly, there is a need for an improved structural maintenance system.

It will be clearly understood that, if a prior art publication is referred to herein, this reference does not constitute an admission that the publication forms part of the common general knowledge in the art in Australia or in any other country.

SUMMARY OF INVENTION

The present invention is directed to a structural maintenance system, which may at least partially overcome at least one of the abovementioned disadvantages or provide the consumer with a useful or commercial choice.

With the foregoing view, the present invention in one form, resides broadly in a structural maintenance system, configured to maintain a structure including a plurality of elongate members, the structural maintenance system including:

a delivery module, configured to navigate between the elongate members;

a maintenance module, coupled to the delivery module, and configured to navigate along the elongate members, to maintain the structure.

Advantageously, the system enables automatic in-situ maintenance of the structure. As a result, maintenance may be performed regularly and at low cost (such maintenance is less labour intensive than manual maintenance by divers, and may thus be less expensive) which in turn results in better maintenance. Better maintenance can then, in turn, result in reduced damage to the structure.

Preferably, the system is configured to maintain a structure that is at least partly submerged in water. Suitably, the maintenance system is a pier maintenance system, wherein the maintenance module is configured to maintain piles of the pier.

Preferably, the delivery module is configured to navigate in a plane. Preferably, the elongate structures extend outwardly from the plane. Suitably, the elongate structures are substantially perpendicular to the plane.

Preferably, the delivery module is configured to navigate along tracks coupled to the structure. Suitably, the tracks may be coupled to an underside of the structure.

Preferably, the tracks comprise a trunk that extends along a length of the structure, and a plurality of branches that extend from the trunk, across a width of the structure.

Preferably, the maintenance module comprises a maintenance ring, configured to extend around the elongate members.

Preferably, the delivery module includes an arm, for positioning the maintenance module on the elongate members.

Preferably, the maintenance module is releasably coupled to the delivery module.

Preferably, the maintenance module is configured to navigate along the elongate members independently of the delivery module.

Preferably, the structural maintenance system further includes an inspection module, coupled to the delivery module, and configured to navigate along the elongate members, to inspect the structure.

Suitably, the inspection module includes a stereoscopic sensor, an ultrasonic scanner, a radar sensor and/or a laser sensor/scanner. According to certain embodiments, the inspection module includes a plurality of sensors, wherein the plurality of sensors includes at least two different types of sensors, for capturing different types of data relating to the elongate structure.

According to certain embodiments, the inspection module device includes an accelerometer, to align the sensor data to positions on the elongate structure.

Preferably, the structural maintenance system further includes an assessment module, and configured to assess the elongate members based upon data from the inspection module.

Preferably, the assessment module is configured to control, at least in part, the maintenance module.

Preferably, the maintenance module comprises a cleaning module, a painting module, a cutting module, and/or an epoxy module.

Preferably, the inspection module and the maintenance module are included on a single device.

Preferably, the maintenance module is configured to operate under water.

The maintenance module may include tracks to facilitate the navigation of the maintenance module along the elongate member. The tracks may be configured to apply pressure inwards towards elongate member.

The maintenance module may be coupled to a frame defining the opening for receiving the elongate member, and wherein the maintenance module is configured to move relative to the frame.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
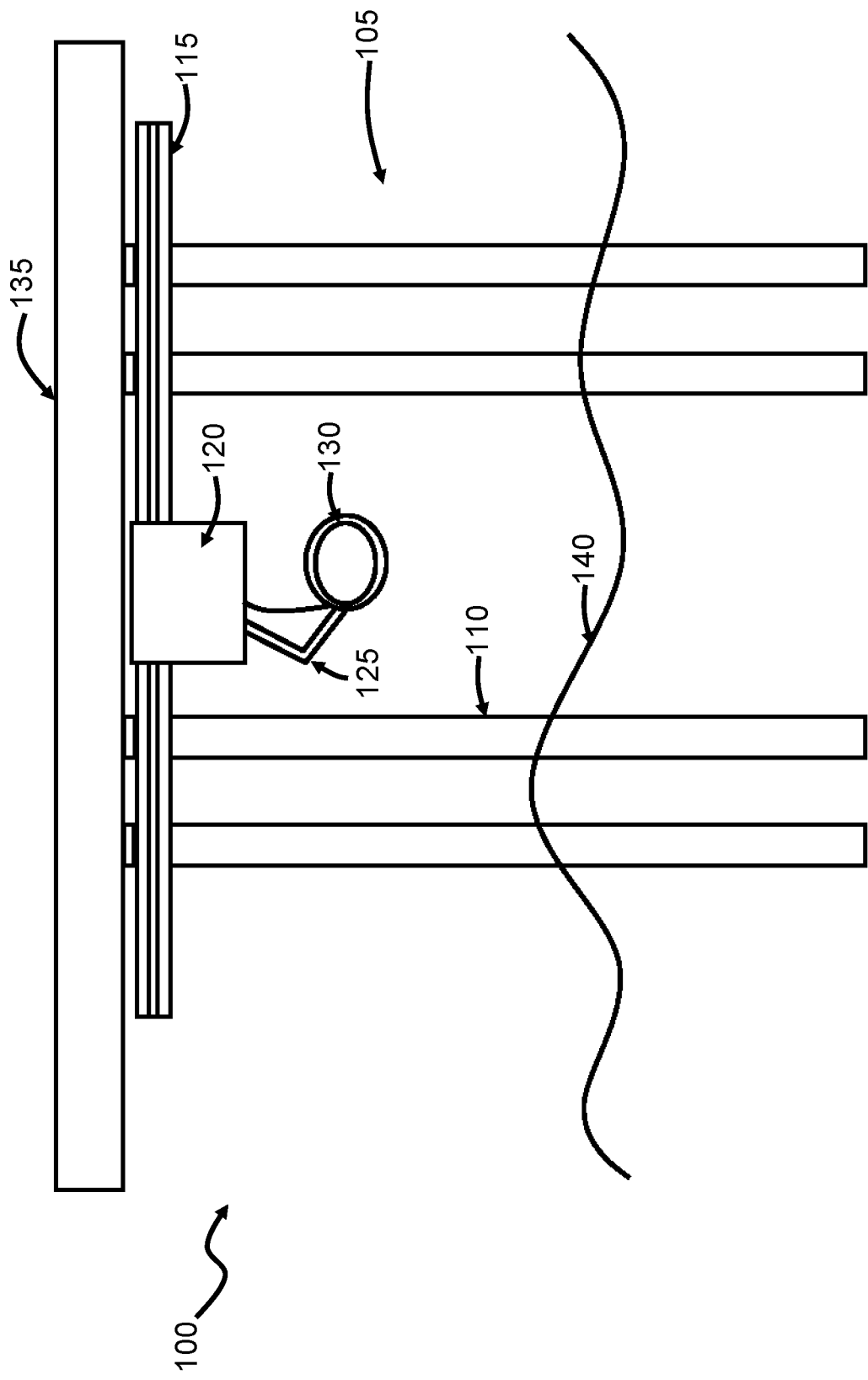
FIG. 1 illustrates an end view of a structural maintenance system for automated inspection, maintenance and repair of a structure, according to an embodiment of the present invention.

FIG. 1 illustrates an end view of a structural maintenance system 100 for automated inspection, maintenance and repair of a structure 105, according to an embodiment of the present invention. The structure 105 is a pier, with partially submerged (underwater) piles 110, but as discussed below, the system 100, or variations thereof may be used in relation to other types of structures.

Advantageously, the maintenance system 100 enables the structure 105, and in particular the piles 110 thereof, to be automatically inspected, maintained and repaired. The system 100 is less labour intensive than manual inspection and repair, and as such, is less costly. Use of the system 100 enables thorough inspection and maintenance of the structure 105 can be performed regularly and at low cost, which prevents damage of the structure from going unnoticed, and becoming more costly.

The monitoring system 100 includes a monorail 115, around which a delivery vehicle 120 may travel. The delivery vehicle 120 includes arm 125 configured to position an underwater robot 130 on the piles 110 of the structure 105.

The monorail 115 is located directly beneath a platform 135 of the structure, and as such is generally not visible from the platform 135. As such, the monorail 115 and the delivery vehicle 120 is located above water level 140.

The skilled addressee will readily appreciate that the platform 135 may comprise a deck portion of a pier, or may support a building or other structure above the water. Similarly, the structure may extend from land into water, such that part of the structure is supported by the platform 135, and part of the structure is supported by land.

Figure 2:
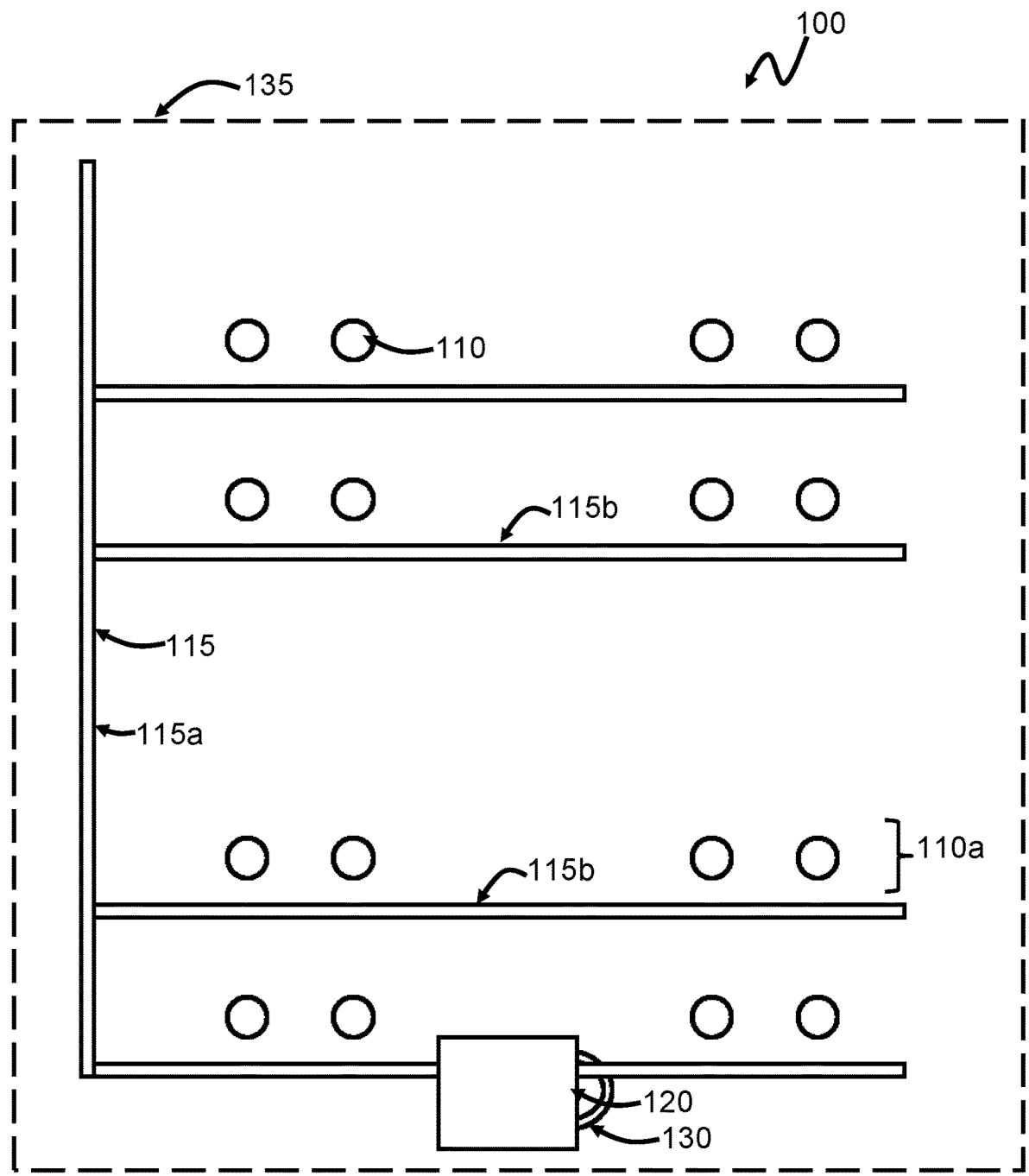
FIG. 2 illustrates a top view of the monitoring system of FIG. 1, with the platform removed to illustrate a layout of the monorail with reference to the piles.

FIG. 2 illustrates a top view of the monitoring system 100, with the platform 135 removed to illustrate a layout of the monorail 115 with reference to the piles 110. The monorail is generally formed in a plane, and generally perpendicular to the piles.

As best illustrated in FIG. 2, the structure comprises a plurality of piles 110 arranged in rows 110a. Each row 110a includes four piles 110, and four rows 110a are illustrated. The skilled addressee will, however, appreciate that any number of rows may be present, and the rows may include any number of piles.

The monorail 115 comprises a trunk portion 115a, which extends along a length of the structure (and in a direction perpendicular to the rows 110a), and a plurality of branch portions 115b, that extend from the trunk portion 115a and along a width of the structure (and along a direction of the rows 110a). In particular, the trunk portions 115b are arranged such that they each align with a row 110a of piles 110, and the monorail 115 is configured such that it provides access to each of the piles 110 by the delivery vehicle 120 and robot 130. This enables each of the piles to be inspected, maintained and repaired, as outlined below.

The system 100 is configured such that the delivery vehicle 120 automatically navigates along the monorail 115, places the robot on a piles 110, and is repeated for each of the piles 110, and then repeated continuously. The system 100 may be configured such that the delivery vehicle 120 and robot 130 goes from one end of the structure 105 to the other, across the structure in a predefined pattern, randomly between piles, or according to previous analysis of the piles.

For example, the system 100 may determine that the piles 110 furthest out to sea face the most damage or wear, and configure the delivery vehicle 120 and robot 130 to inspect and maintain these piles 110 more often than piles 110 closer to shore.

The skilled addressee will readily appreciate that the system 100 need not be in constant use, but can instead be configured to operate periodically. For example, the system 100 may be configured to inspect and maintain the piles once a week, once a month, or at any suitable interval. Similarly, the system 100 may be configured that maintenance is performed at a different interval to the inspection interval. As an illustrative example, the system may be configured to inspect piles weekly, but to clean piles monthly.

According to certain embodiments, the system 100 also includes an interface, in which an operator may manually configure the delivery vehicle 120 and robot 130 to inspect, maintain or repair a particular pile 110 or area. This is particularly advantageous if the operator is aware that damage has taken place (e.g. a surface of one of the piles 110 has been physically damaged) rather than waiting for the system 100 to discover this itself.

The interface may also enable an operator to view details of the inspections, maintenance or repairs performed by the system 100. The results may be dynamically displayed, e.g. where the operator is able to select what data he or she is interested in, or in the form of reports, where the system may periodically generate compliance reports, or the like.

The interface is advantageously provided in the form of a web site accessible by the Internet. However, the skilled addressee will readily appreciate that it may be provided in any suitable form, including on a screen that form parts of the system 100 or is otherwise coupled to the system 100.

Figure 3:
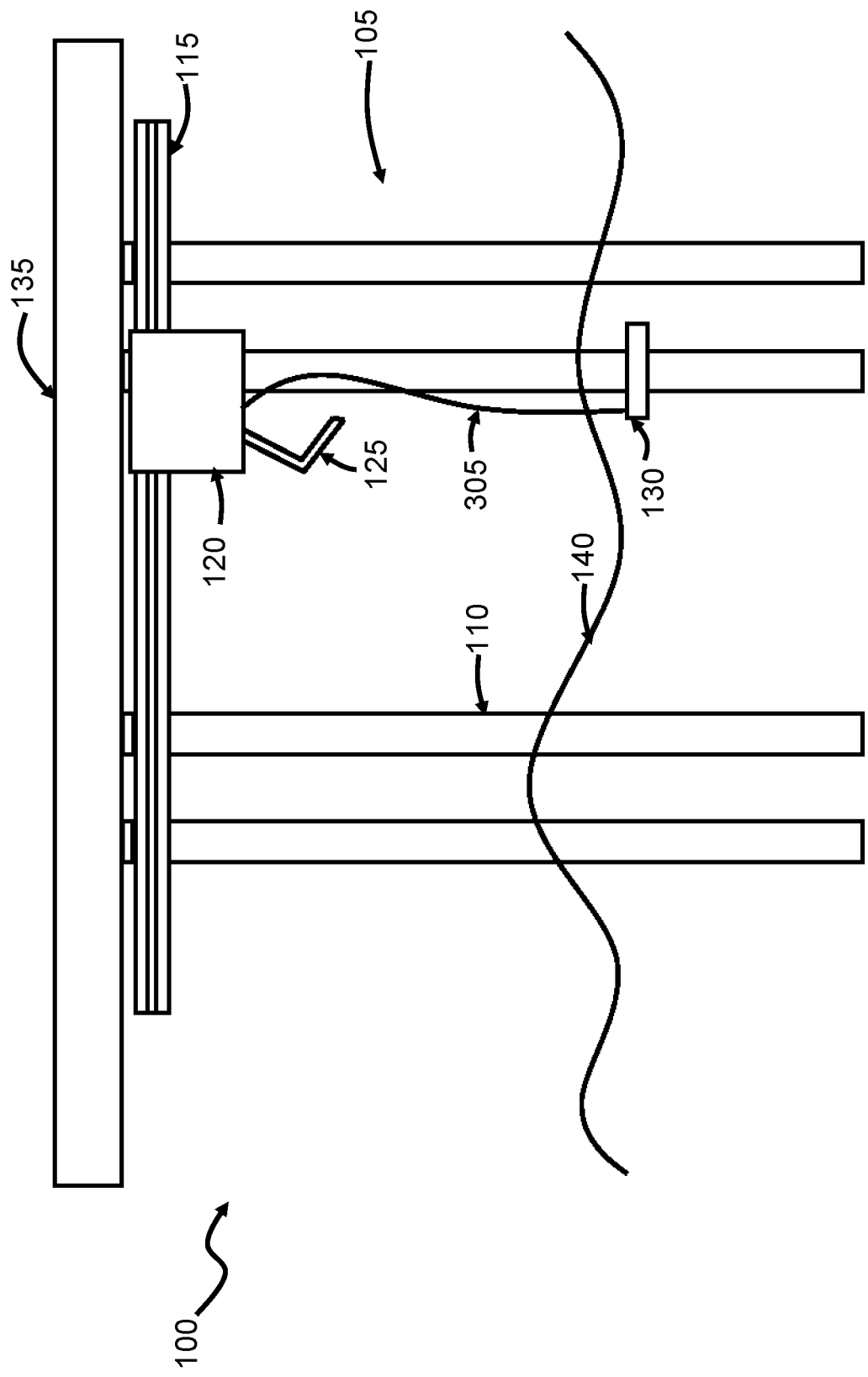
FIG. 3 illustrates the end view of the structural maintenance system of FIG. 1, with the robot attached to a pile, decoupled from the arm, and partway down the pile to perform inspection, maintenance or repair of the pile.

FIG. 3 illustrates the end view of the structural maintenance system 100, wherein the robot 130 is attached to a pile 110, has decoupled from the arm 125, and is partway down the pile 110 performing inspection, maintenance or repair of the pile 110.

As best shown in FIG. 3, the robot 130 is coupled to the delivery vehicle 120 by a tether 305, which both ensures that the robot 130 does not detach from the delivery vehicle 120, but also provides a communications means between the delivery vehicle 120 and the robot 130. This in turn enables distributed processing between the robot 130 and the delivery vehicle 120, for example, such that the delivery vehicle 120 controls movement of the robot 130.

As discussed in further detail below, the robot 130 includes an inspection module, an assessment module and a maintenance module.

The inspection module comprises a plurality of sensors, such as visual (e.g. stereoscopic sensors), ultrasonic, as well as radar, to enable both surface and subsurface inspection of the piles 110. Preferably, the sensors cover overlapping areas, enabling data from multiple sensors to be used together.

The assessment module is configured to automatically analyse (e.g. based upon artificial intelligence) inspection data of the sensors, and make decisions regarding maintenance and repair based thereon. For example, the assessment module may identify a crack in a pile based upon the sensor data of the inspection module, and determine to fill the crack with epoxy.

Finally, the maintenance module which includes grit blasting, laser paint and/or rust removal, spray painting, and high pressure cleaning capabilities, along with a repair module, which includes plasma/ultra-thermic cutting, epoxy injection and welding capabilities. This enables the system 100 to perform the maintenance and repair identified by the assessment module.

The skilled addressee will, however, readily appreciate that the robot 110 any combination of sensors, preferably non-destructive testing (NDT) sensors, and maintenance and repair tools may be incorporated.

Figure 4:
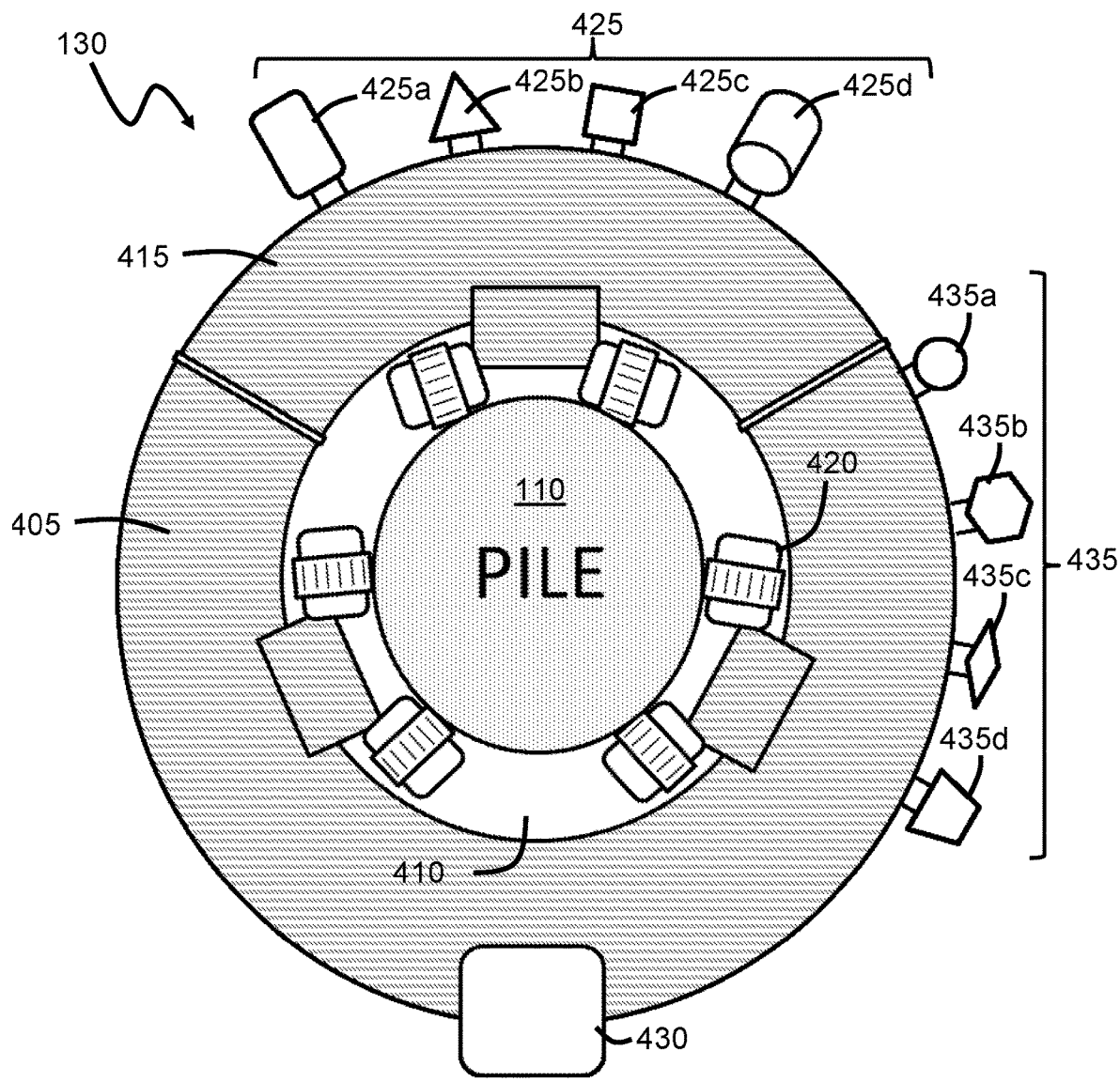
FIG. 4 illustrates a top view of the robot of the system of FIG. 1 around the pile.

FIG. 4 illustrates a top view of the robot 130 of the system 100 around the pile 110.

The robot 130 comprises a frame 405, the frame 405 forming a ring and extending peripherally around the pile 110. The frame 405 is substantially circular in shape and includes an opening 410 in which the pile 110 is received.

The frame 405 includes a hinged portion 415, which enables installation of the robot 130 to the pile 110. In particular, the hinged portion 415 is configured to pivot outwards from the frame 405, allowing access to the opening 410, such that the hinged portion 415 can again close around the pile 110.

The hinged portion 415 can include any combination of hinges, actuators, gears and the like, to enable the robot 130 to be installed around the pile 110 without human intervention. This is particularly advantageous as it enables the system 100 to move between piles 110 autonomously.

The robot 130 further includes a plurality of tracks 420, peripherally arranged around the opening 410, which are configured to enable the robot 130 to navigate along the pile 110. The tracks 420 can be formed of rubber or similar material to provide a suitable grip against a surface of the pile 110 and to conform to local irregularities of the pile 110. The tracks 420 are configured to apply pressure inwards towards the pile 110.

The robot 130 further includes an inspection module 425 comprising a plurality of sensors in the form of a stereoscopic sensor 425a, an ultrasonic scanner 425b, a radar sensor 425c and a laser scanner 425d, to enable both surface and subsurface inspection of the piles 110. Preferably, the sensors cover overlapping areas, enabling data from multiple sensors to be used together.

The robot 130 includes an assessment module 430, which receives data from the inspection module 425, to automatically analyse (e.g. based upon artificial intelligence) inspection data of the sensors, and make decisions regarding maintenance and repair based thereon.

Finally, the robot 130 includes maintenance module 435 which includes a cleaning module 435a, a painting module 435b, a cutting/welding module 435c, and an epoxy injection module 435d. The cleaning module 435a may include a high pressure cleaning module, a grit blasting module, laser paint and/or rust removal, brushes, or the like. Similarly, the cutting/welding module 435c may include a plasma/ultra-thermic cutting module.

This maintenance module 435 enables the system 100 to perform the maintenance and repair as identified by the assessment module 430.

The inspection module 425 and the maintenance module 435 are configured to rotate relative to the frame 405, to enable capture of data and repairs to be performed on all areas of the pile 110. In particular, the frame 405 may stay in a fixed position relative to the pile 110, while the inspection module 425 and the maintenance module 435 move around the pile 110.

Alternatively, the robot 130 may be configured to rotate around the pile. For example, the tracks 420 may pivot, enabling the robot 130 to rotate around the pile 110 through movement of the tracks 420.

The assessment module 430 may be configured to generate a three-dimensional surface model of the pile 110 based upon the sensor data of the inspection module 425. The laser scanner 425 may, for example, generate a plurality of point measurements, which are together used to generate a three dimensional surface model, upon which data from the other sensors is overlaid. This enables the detection of flaws in the pile 110 that may not be readily apparent when viewing sensor data from a single sensor, and as such, provides increased accuracy.

The assessment module 430 may further be configured to compare sensor data over time. This enables changes in the pile 110 to be identified, which in turn enables more efficient corrosion or wear detection and prediction.

As previously discussed, the assessment module 430 may include an artificial intelligence module, upon which assessment is based. For example, the artificial intelligence module may be able to identify maintenance problems such as corrosion lesions, spalling, and growth, based upon previous data and intelligence.

Finally, the robot 130 further includes an accelerometer (not illustrated), for measuring an acceleration (and deceleration) of the robot. The accelerometer can be used to help align measured data points with a real world position on the pile 110. For example, combining accelerometer data with sensor data can help give the system 100 the ability to pinpoint problem areas to real world points, and provide an ability to align sensor data in real time.

In addition to being able to autonomously inspect and maintain the structure 105, the system 100 can be used to output the surface and sensor data for offline analysis by a structural engineer or other suitably qualified person. As an illustrative example, the system 100 can output a computer-aided design (CAD) model, for example in a .CAD, .DXF, .IGES, .STEP, or solidworks file.

Figure 5:
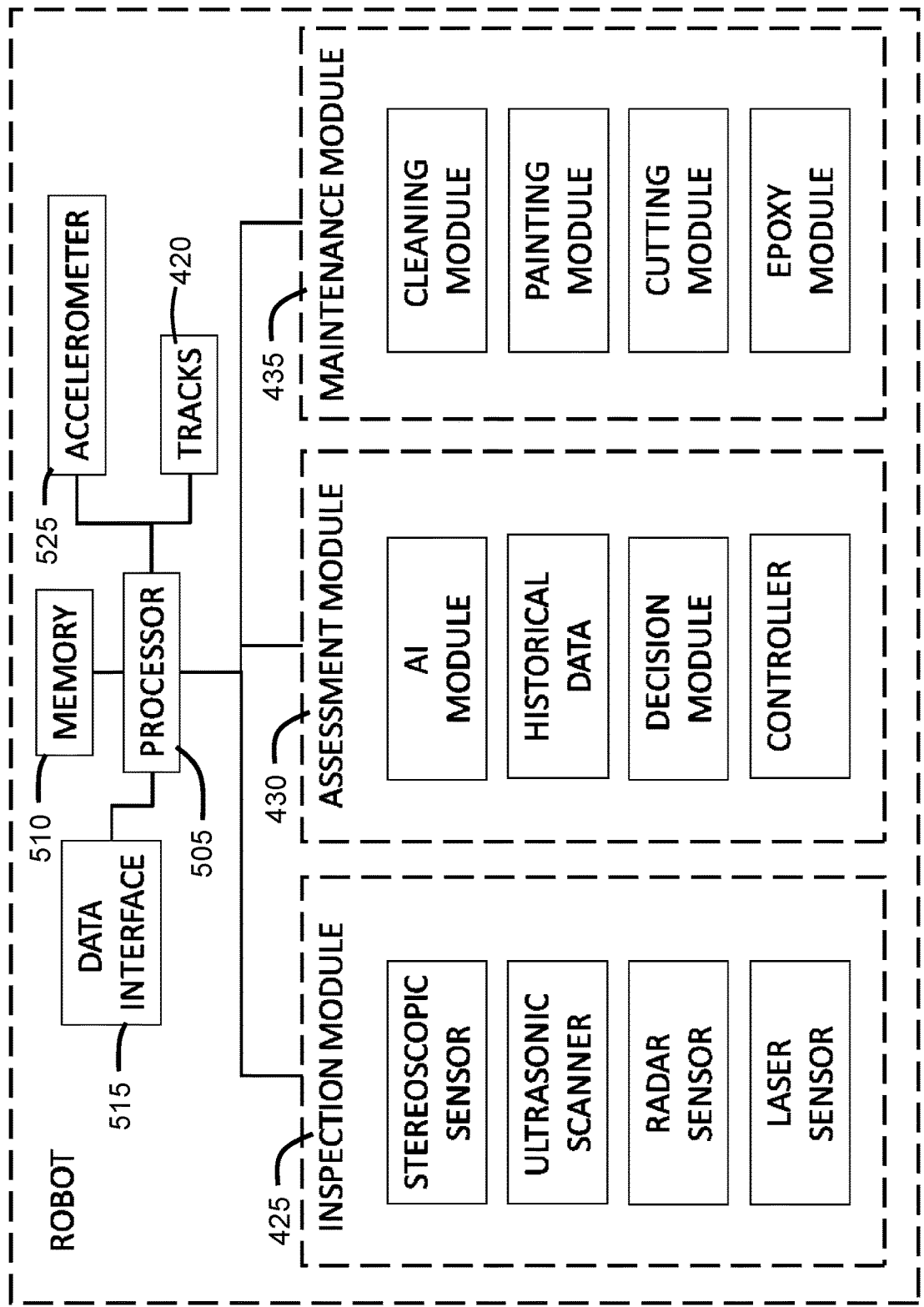
FIG. 5 illustrates a schematic of the robot of the system of FIG. 1.

FIG. 5 illustrates a schematic of the robot 130 of FIG. 1, according to an embodiment of the present invention.

The robot 130 includes a processor 505, a memory 510 coupled to the processor 505, and a data interface 515 coupled to the processor.

The inspection module 425, the assessment module 430, and the maintenance module 435, are also coupled to the processor 505.

The inspection module 425 includes a stereoscopic sensor (or sensors), an ultrasonic scanner, a radar sensor and a laser sensor/scanner. This enables a comprehensive overview of the pile, both internally and externally. However, the skilled addressee will readily appreciate that any suitable combination of sensors may be used.

The assessment module 430 includes an artificial intelligence (AI) module, a historical data module, a decision module and a controller. The AI module may detect problems in the pile based upon the sensor data, for example in combination with historical data. Each time sensor data is provided, the AI module may update itself so that better decisions can be made in the future. The decision module determines an appropriate action based upon an output of the AI module, and the controller controls the maintenance module (or parts thereof) to perform the action.

The maintenance module 435 includes a cleaning module (such as a pressure washer, laser paint and/or rust removal, a painting module, a cutting module, and an epoxy (or filling) module. This enables comprehensive repair and maintenance of the pile, however, the skilled addressee will readily appreciate that any suitable combination of tools may be used.

The memory 510 includes instruction code executable by the processor 505 for capturing data using the inspection module 425, providing the captured data to the assessment module 430 for assessment, and for the assessment module 430 to control the maintenance module 435.

Furthermore, the memory 510 includes instruction for controlling the tracks 420, and for receiving instructions on the data interface for controlling a navigation of the robot 130. As discussed above, the robot 130 may receive instructions to scan an area of the pile 110 further in case non-typical data is initially collected at that area.

Finally, as discussed above, the robot 130 includes an accelerometer 525 coupled to the processor 505, for estimating an acceleration of the robot 130. The acceleration data can be coupled, by the processor 525, to sensor data, to provide a context to the sensor data. As such, the accelerometer 525 can help align measured data points with a real world position on the pile 110.

Embodiments of the present invention provide a level of automation that substantially alleviates the requirement for high-risk work to be undertaken by human personnel. It allows work to be continuously undertaken without the requirement for breaks and weather intervention. As a result, a decrease in overall annual costs of monitoring and maintenance tasks may be provided.

The system constantly monitors the structural integrity of the piles, and is able to predict potential weaknesses and take action in response thereto. This may substantially lengthen the viable working life of the structure by constant deployment of inspection and maintenance services.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A structural maintenance system, configured to maintain a structure including a platform and an arrangement of piles that support the platform above water and are partially submerged, wherein the arrangement of piles defines multiple rows of piles with each of the multiple rows of piles having multiple piles within the respective row; the structural maintenance system comprising:
   a layout of tracks supported above water and defined at least partially within the arrangement of piles, the layout of tracks including:
      at least one trunk track that extends outwardly of the arrangement of piles; and
      at least one branch track that extends from the at least one trunk track between an adjacent pair of rows of the multiple rows of piles;
   a delivery module movably supported on the layout of tracks for moving along the layout of tracks to selectively pass each of the piles in the arrangement of piles;
   a frame that:
      is coupled the delivery module and carried above water by the delivery module during a delivery task;
      is decoupled from the delivery module and surrounds a respective pile of the arrangement of piles during at least one of:
         an inspection task, an
         assessment task, and
         a maintenance task;
   an inspection module having at least one sensor mounted to the frame for performing the inspection task;
   an assessment module receiving data from the inspection module for analyzing a characteristic of the respective pile during the assessment task; and
   a maintenance module having at least one maintenance tool mounted to the frame for performing the maintenance task to the respective pile based on the assessment task.

2. The system of claim 1, wherein the delivery module is configured to navigate in a plane.

3. The system of claim 2, wherein the maintenance module includes elongate members that extend outwardly from the plane.

4. The system of claim 3, wherein the elongate members are substantially perpendicular to the plane.

5. The system of claim 3, wherein the delivery module includes an arm, for positioning the maintenance module on the elongate members.

6. The system of claim 3, wherein the maintenance module is configured to navigate along the elongate members independently of the delivery module.

7. The system of claim 3, wherein the inspection module is coupled to the delivery module, and configured to navigate along the elongate members.

8. The system of claim 7, wherein the inspection module includes a stereoscopic sensor, an ultrasonic scanner, a radar sensor and/or a laser sensor/scanner.

9. The system of claim 7, wherein the at least one sensor includes a plurality of sensors, wherein the plurality of sensors includes at least two different types of sensors, for capturing different types of data relating to the elongate member.

10. The system of claim 7, wherein the inspection module device includes an accelerometer, to align the sensor data to positions on the elongate member.

11. The system of claim 7, wherein the assessment module is configured to assess the elongate members based upon data from the inspection module.

12. The system of claim 11, wherein the assessment module is configured to control, at least in part, the maintenance module.

13. The system of claim 7, wherein the maintenance module comprises:
    an epoxy module; or
    an epoxy module and at least one of:
        a cleaning module,
        a painting module, and/or
        a cutting module.

14. The system of claim 7, wherein the inspection module and the maintenance module are included on a single device.

15. The system of claim 3, wherein maintenance module is coupled to the frame defining the opening for receiving the elongate member, and wherein the maintenance module is configured to move relative to the frame.

16. The system of claim 1, wherein the delivery module is configured to navigate along the tracks, the tracks being coupled to a pier.

17. The system of claim 16, wherein the tracks are coupled to an underside of the pier.

18. The system of claim 1, wherein the maintenance module is releasably coupled to the delivery module.

19. The system of claim 1, wherein the maintenance module is configured to operate under water.

* * * * *